United States Patent [19]

Tsuge et al.

[11] Patent Number: 4,599,629

[45] Date of Patent: Jul. 8, 1986

[54] MAGNETIC INK DOT PRINTER WITH MEANS FOR CONTROLLING PRINT DENSITY

[75] Inventors: Takeyoshi Tsuge; Yoshihiro Torisawa; Ayumu Makino, all of Mishima, Japan; Tsutomu Kimura, deceased, late of Mishima, Japan, by Shizuko Kimura, legal representative

[73] Assignee: Tokyo Electric Co., Ltd., Tokyo, Japan

[21] Appl. No.: 617,360

[22] Filed: Jun. 5, 1984

[30] Foreign Application Priority Data

Jun. 10, 1983 [JP] Japan ............................... 58-103959

Jun. 21, 1983 [JP] Japan ............................... 58-111681

[51] Int. Cl.$^4$ ............................................ G01D 15/16

[52] U.S. Cl. ................................ 346/140 R; 400/124

[58] Field of Search .............. 346/75, 140 A, 140 PD; 400/124, 470, 471, 471.1

[56] References Cited

U.S. PATENT DOCUMENTS 4,315,267 2/1982 Sonoda et al. .

4,359,752 11/1982 Nakagawa et al. .

FOREIGN PATENT DOCUMENTS 0042293 12/1981 European Pat. Off. .

5695682 8/1981 Japan .

42972A 3/1984 Japan .................................. 400/124

48165A 3/1984 Japan .................................. 400/124

*Primary Examiner*—E. A. Goldberg

*Assistant Examiner*—Mark Reinhart

*Attorney, Agent, or Firm*—Frishauf, Holtz, Goodman & Woodward

[57] ABSTRACT

An ink dot printer includes an ink tank for storing magnetic ink, a pair of magnetic pole plates arranged opposite to each other to form a slit, one end of the pair of plates being immersed in the magnetic ink in the ink tank. An electromagnet magnetizes the paired magnetic pole plates to introduce the magnetic ink in the ink tank into the slit to form a magnetic ink film therein, and a plurality of needles arranged adjacent to one another in the longitudinal direction of the slit are each freely movable in the longitudinal direction of the needle between a first position where its one end portion is immersed in the magnetic ink film in the slit between the paired magnetic pole plates and a second position where its one end portion is projected from the magnetic ink film in the slit. An electromagnet selectively drives the needles to move them from the first to the second position, and a variable resistance controls the strength of magnetic force generated by the electromagnet by controlling the voltage supplied to the electromagnet. Magnetic ink, which has been stuck to the one ends of the needles at the first position, is forced onto a recording paper at the second position to form dots of magnetic ink of controlled density. By the gathering of the dots, symbols such as characters and numerals are printed.

15 Claims, 14 Drawing Figures

MAGNETIC INK DOT PRINTER WITH MEANS FOR CONTROLLING PRINT DENSITY

BACKGROUND OF THE INVENTION

The present invention relates to an ink dot printer including a means for storing magnetic ink; a pair of magnetic pole plates arranged opposite to each other to form a slit whose one end is immersed in magnetic ink supplied from the magnetic ink storing means; and a magnetism generating means for magnetizing the pair of magnetic pole plates to introduce magnetic ink supplied from the magnetic ink storing means into the slit and form a magnetic ink film in the slit. A plurality of needles are arranged adjacent to one another along the longitudinal direction of the slit and are each freely movable in the longitudinal direction of the needle between a first position where one needle end portion is immersed in the magnetic ink film in the slit formed by the paired magnetic plates and a second position where the one needle end portion is projected from the magnetic ink film in the slit. Driving means selectively drives the needles to move from the first position to the second position, wherein the one or more needles selected force magnetic ink, which has been stuck on the end faces of the one needle end portions at the first position, onto a recording paper at the second position to form dots of magnetic ink on the recording paper. Symbols such as characters or numerals are printed on the recording paper by the grouping of these dots.

A wire dot printer or thermal printer is normally used as a ink dot printer. The wire dot printer selectively drives needles whose tips directly strike a pressure-sensitive manifold paper on a platen or whose tips indirectly strike a recording paper on the platen through an ink ribbon interposed between the tips of the needles and the recording paper. In this fashion, dots are formed on the pressure-sensitive manifold paper or recording paper to print symbols, such as characters or numerals, by the grouping of these dots. In this conventional wire dot printer, however, a large amount of noise is caused when the symbols are printed onto the pressure-sensitive manifold paper or recording paper. In addition, no other paper except for the pressure-sensitive manifold paper can be used. Further, the expensive ink ribbon of the latter method must be changed frequently. The expensive ink ribbon also must be used in the thermal printer.

In order to eliminate the drawbacks of the conventional wire dot printer or thermal printer, there have been proposed various kinds of ink dot printers wherein magnetic ink is stuck on the end faces of the front end portions of the needles and wherein these needles are driven selectively to transfer the magnetic ink onto the recording paper to form dots thereon.

In the case of the conventional wire dot and thermal printers as described above, the density of dots formed on the recording paper is uniform, thereby keeping densities of printed symbols, such as characters and numerals, uniform.

SUMMARY OF THE INVENTION

The present invention is intended to eliminate the above-mentioned drawbacks, and an object of the present invention is, therefore, to provide an ink dot printer capable of freely determining the density of dots and, therefore, also the densities of printed symbols, such as characters and numerals, without generating a loud noise at the time of forming the dots on a recording paper.

The object of the present invention can be achieved by an ink dot printer comprising means for storing magnetic ink; a pair of magnetic pole plates arranged opposite to each other to form a slit, whose one end is immersed in the magnetic ink supplied from the magnetic ink storing means; magnetism generating means for magnetizing the paired magnetic pole plates to introduce the magnetic ink supplied from the magnetic ink storing means into the slit to form a magnetic ink film therein; a plurality of needles arranged adjacent to one another in the longitudinal direction of the slit and each freely movable in the longitudinal direction of the needle between a first position where one needle end portion is immersed in the magnetic ink film in the slit between the paired magnetic pole plates and a second position where the one needle end portion is projected from the magnetic ink film in the slit; driving means for selectively driving the needles to move them from the first to the second position; and magnetic force control means for controlling the strength of magnetic force generated by the magnetism generating means; wherein the selected single or plural needles force the magnetic ink, which has been stuck to their ends at the first position, onto a recording paper at the second position to form dots of magnetic ink, by the gathering of which symbols, such as characters and numerals, are printed.

In the case of the ink dot printer according to the present invention, it is preferable that the magnetism generating means include an electromagnet, and that the magnetic force control means controls current or voltage supplied to the electromagnet to control the strength of magnetic force generated by the electromagnet. When arranged like this, the construction of the magnetic force control means is simple, thereby allowing the manufacturing and assembly of the magnetic force control means to be simplified.

In the case where the ink dot printer of the present invention is arranged as described above, the magnetic force control means can include a variable resistance which controls the strength of magnetic force generated by the electromagnet by controlling voltage supplied to the electromagnet.

According to the ink dot printer of the present invention, the magnetic force control means can include automatic print density holding means which reads the density of dots on the recording paper, compares it with the reference density previously set, and controls the current or voltage supplied to the electromagnet on the basis of a value obtained by comparing the densities, thus controlling the strength of magnetic force generated by the electromagnet and maintaining the density of dots formed on the recording paper equal to the reference density. Further, the automatic print density holding means can include a variable resistance which controls the strength of magnetic force generated by the electromagnet by controlling voltage supplied to the electromagnet.

When constructed like this, the density of the dots formed can be held equal to the reference density previously set with relative exactness for a relatively long time period. And the automatic print density holding means which can achieve such a function can be very easily prepared by those skilled in the art by combining the conventional techniques.

With the ink dot printer of the present invention, which uses magnetic ink, a through-hole is normally provided in the magnetic ink storing means to supply the magnetic ink from the magnetic ink storing means into the slit between the paired magnetic pole plates. And it is desired that the cross-sectional area of this through-hole be made as small as possible to prevent the evaporation of magnetic ink in the magnetic ink storing means and to prevent dust from entering into the magnetic ink storing means. When the cross-sectional area of the through-hole is made too small, however, the magnetic ink floods out of the through-hole and splashes around the magnetic ink storing means. The magnetization of the paired magnetic pole plates, by means of the magnetism generating means, is stopped to collect the magnetic ink from the slit through the through-hole into the magnetic ink storing means at the time of finishing the printing operation of the ink dot printer.

According to the ink dot printer of the present invention, the magnetic force control means includes magnetic force lowering means for gradually reducing the strength of the magnetic force at the time when the magnetic generating means finishes its magnetic force generating operation in order to prevent the magnetic ink from splashing out of the through-hole, even when the cross-sectional area of the through-hole is small.

When constructed like this, the strength of magnetic force generated in the slit is gradually decreased, and the magnetic ink in the slit is not concentrated but gradually advanced to the magnetic ink storing means, thereby preventing the magnetic ink from flooding out of the through-hole.

When the ink dot printer of the present invention is constructed as described above, the magnetism generating means has the electromagnet, and the magnetic force lowering means can be a capacitor electrically connected to the electromagnet. This magnetic force lowering means having such an arrangement can be easily constructed, and the manufacturing and assembly thereof can be simplified.

DETAILED DESCRIPTION OF THE PREFERRED EMBODIMENTS

Figure 1:
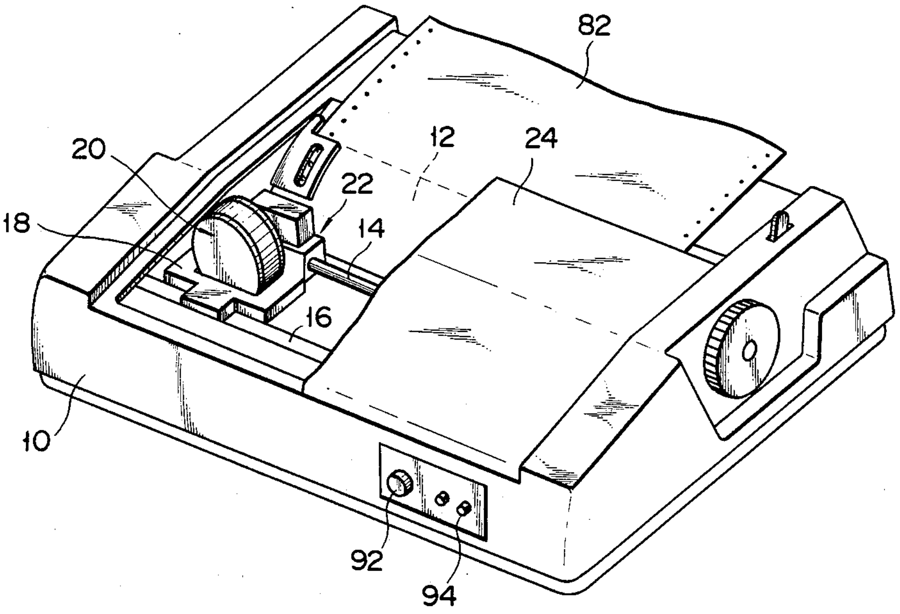
FIG. 1 is a perspective view roughly showing the whole of an example of the ink dot printer according to the present invention.

An ink dot printer of the first embodiment of the present invention is roughly shown in FIG. 1. In a housing 10 of the ink dot printer, a platen 12 is horizontally arranged with its longitudinally central axis extending in a right and left direction, and a carrier shaft 14 and a guide shaft 16 are arranged in parallel to the longitudinally central axis of the platen 12. To the carrier shaft 14 and the guide shaft 16, a carriage 18 is mounted so as to reciprocate along the carrier shaft 14 and the guide shaft 16. The carriage 18 is reciprocatably driven by well known carriage driving means. A printing head 20 and an ink film forming means 22 are mounted on the carriage 18. The housing 10 has a cover 24 which covers the platen 12, carrier shaft 14, guide shaft 16, carriage 18, printing head 20, and ink film forming means 22, as shown in FIG. 1. The cover 24 is partially cut away in FIG. 1 for clarity of description.

Figure 2:
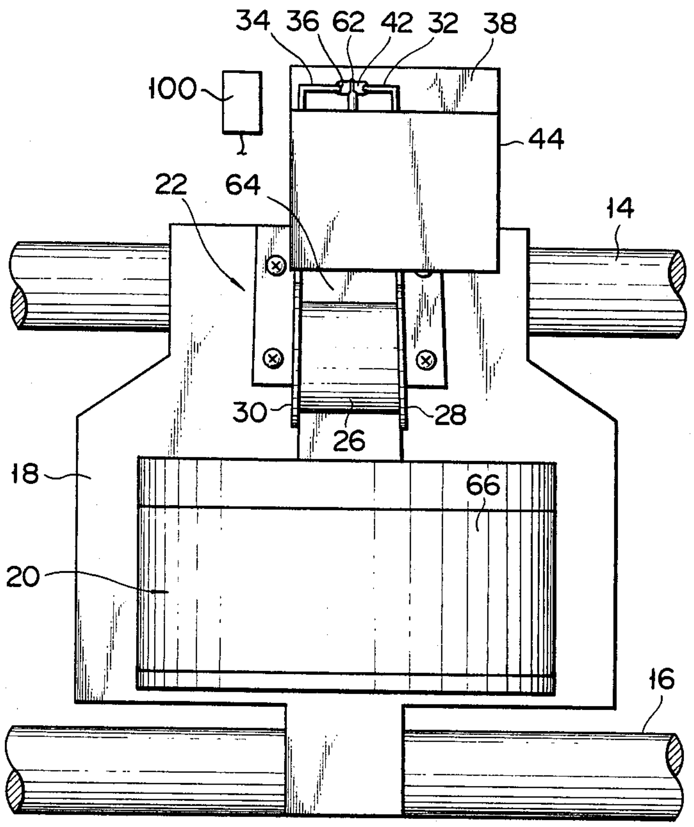
FIG. 2 is a plane view roughly showing, in enlarged scale, the printing head and ink film forming means in FIG. 1.
Figure 3:
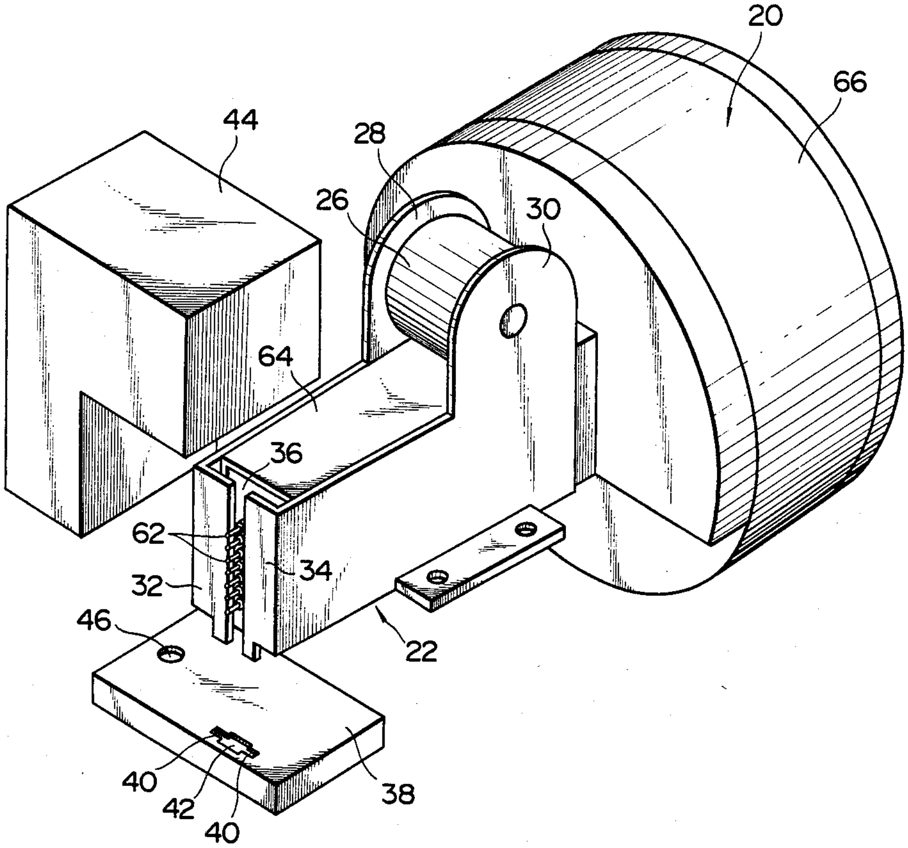
FIG. 3 is a perspective view roughly showing, in enlarged scale, the whole of the printing head and ink film forming means in FIG. 1, wherein a pair of magnetic pole plates, ink tank and ink cartridge of the ink film forming means are separated from one another for the sake of clarifying the description.

As shown in FIGS. 2 and 3, the ink film forming means 22 has an electromagnet 26 whose opposite ends are attached to a pair of magnetic pole plates 28 and 30. The front end portions 32 and 34 of the paired magnetic pole plates 28 and 30 are adapted to form a slit 36, under which is arranged an ink tank 38 as a magnetic ink storing means which is freely detachable from the carriage 18.

As shown in particular detail in FIG. 3, a slot 40 into which the lower ends of the front end portions 32 and 34 of the paired magnetic pole plates 28 and 30 are inserted is formed in the upper face of the ink tank 38, said slot 40 having in the center thereof a ventilation hole 42 which corresponds to the slit 36 of the paired magnetic pole plates 28 and 30. A hole 46 for connecting an ink cartridge 44 therewith is also formed in the upper face of the ink tank 38.

Figure 4:
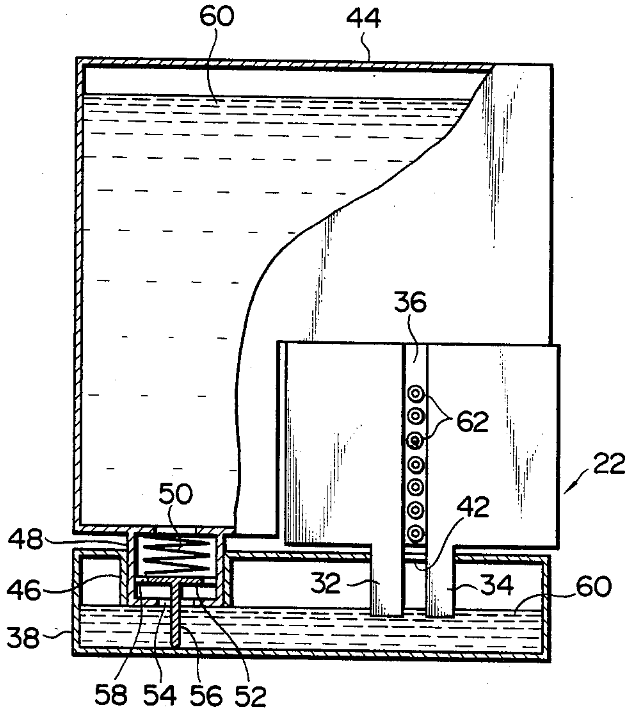
FIG. 4 is a plane view roughly showing, partly cut away, a part of the ink film forming means in FIG. 1.

As shown in FIG. 4, a sleeve 48, detachably fitted into the connecting hole 46 of the ink tank 38, is formed on the underside of the ink cartridge 44. A spring 50 and a plate-shaped plug 52 which is urged downward by the spring 50 are arranged in the sleeve 48. The plug 52 has a push rod 56 extending downward to project outside through a discharge opening 54 which is formed in the bottom of the sleeve 48. The plug 52 is also provided with plural cut-away portions 58 on the outer circumference thereof. The radius of a circle which connects the inner ends of these cut-away portions 58 is set to be larger than that of the discharge opening 54.

In the ink cartridge 44 having the arrangement described above, the push rod 56 is brought into contact with the inner face of the bottom of the ink tank 38 to separate the plug 52 from the discharge opening 54 against the action of the spring 50, as shown in FIG. 4, when the sleeve 48 is fitted into the connecting hole 46 of the ink tank 38. Accordingly, magnetic ink 60 in the ink cartridge 44 flows into the ink tank 38 through the cut-away portions 58 of the plug 52 and the discharge opening 54 of the sleeve 48. The flow of magnetic ink 60 into the ink tank 38 stops when the level of magnetic ink 60 in the ink tank 38 reaches the discharge opening 54 of the sleeve 48 of the ink cartridge 44, and thereafter, the level of magnetic ink 60 in the ink tank 38 is kept equal to the level of the discharge opening 54 of the sleeve 48 of the ink cartridge 44 until no magnetic ink 60 is left in the ink cartridge 44. The front end portions 32 and 34 of the paired magnetic pole plates 28 and 30, which have been inserted into the slot 40 of the ink tank 38, are immersed in the magnetic ink 60 in the ink tank 38 at this time, as shown in FIG. 4.

Figure 5:
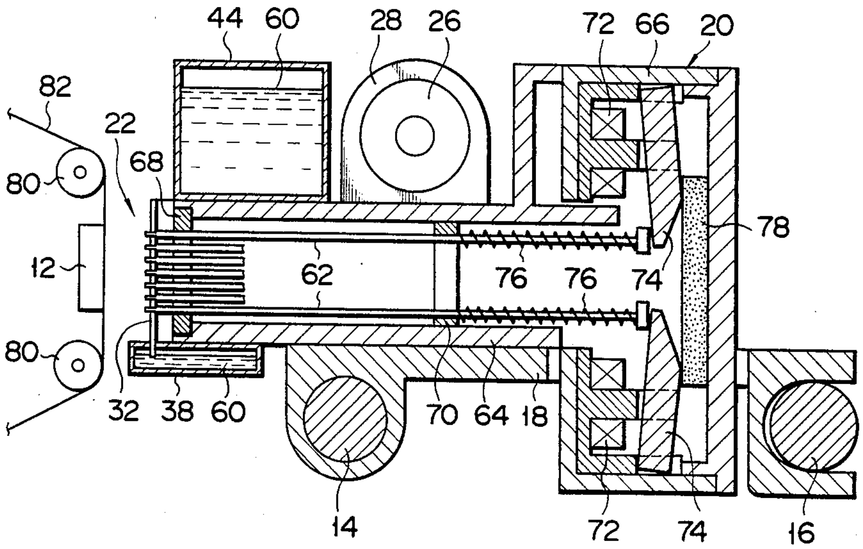
FIG. 5 is a longitudinally sectional view roughly showing the printing head and ink film forming means in FIG. 2, wherein even a platen and a recording paper on the platen are shown, and needles are located at the first position.

As shown in FIGS. 2 through 4, one end portions of the needles 62, arranged adjacent to one another along the longitudinal direction of the slit 36, can be found in the slit 36 of the paired magnetic pole plates 28 and 30. The other opposite end portions of the same needles 62 extend through a frame 64 arranged between the paired magnetic pole plates 28 and 30, as shown in FIGS. 2 and 3, and into the cover 66 of the printing head 20, as shown in FIG. 5. The needles 62 are held in place by needle guides 68 and 70, which permit the needles 62 to be freely movable in the longitudinal direction. The position of the needles 62 in this state is represented as the first position of the needles 62.

As shown in FIG. 5, electromagnets 72 which serve as a means for driving the needles 62 are arranged in the cover 66 of the printing head 20 to correspond to the plural needles 62. Armatures 74, connected to the other end portions of the needles 62, are arranged adjacent to the electromagnets 72. The needles 62 are urged together with the armatures 74 toward their first position shown in FIG. 5 by the action of the return springs 76, each of which is fitted onto an individual needle 62. The armatures, in this state, 74 are contacted with a contact member 78.

As shown in FIG. 5, a recording paper 82 which is fed by paper feed rollers 80 is arranged in front of the printing head 20 and ink film forming means 22 inside the housing 10 shown in FIG. 1. The recording paper 82, is also rested on the platen 12, corresponding in position to the needles 62. The platen 12 is made of a magnet in this embodiment.

Figure 6:
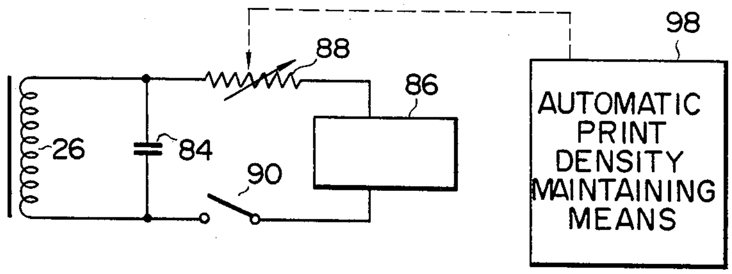
FIG. 6 is a circuit diagram roughly showing connections among a variable resistance, capacitor, power source and a main switch, the variable resistance serving as a magnetic force control means for controlling the strength of the magnetic force generated by an electromagnet, which serves as a magnetic force generating means for forming a magnetic field in a slit between the paired magnetic pole plates of an example of the ink dot printer according to the present invention, and the capacitor serving as a magnetic force lowering means for gradually lowering the strength of magnetic force at the time when the magnetic force generating operation of the electromagnet is finished.

In the case of the ink dot printer of this embodiment, a capacitor 84 is electrically connected between both poles of the electromagnet 26, which serves as the magnetism generating means for magnetizing the paired pole plates 28 and 30, as shown in FIG. 6. A variable resistance 88 and a main switch 90 are electrically connected between the electromagnet 26 and a power source 86 for the electromagnet 26, respectively.

The variable resistance 88 and main switch 90 can be operated by knobs 92 and 94, respectively, which are arranged on the housing 10 of the ink dot printer of the embodiment shown in FIG. 1.

Figure 7:
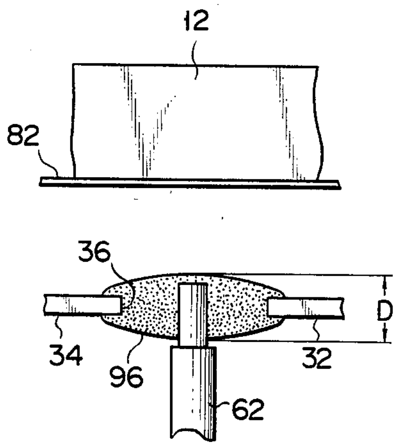
FIG. 7 is a plane view showing, in enlarged scale, the front end portions of the paired magnetic pole plates in FIG. 2 and their adjacent area under such a state that the magnetic ink film is formed in the slit between the front end portions of the paired magnetic pole plates, wherein the needle is located at the first position.

According to the embodiment of the present invention having such an arrangement as described above, current is supplied from the power source 86 to the electromagnet 26 when the knob 94 on the housing 10 is operated to turn ON the main switch 90. As a result, the magnetic ink 60 in the ink tank 38 is drawn into the slit 36 between the paired magnetic pole plates 28 and 30 due to the magnetic flux created between the paired magnetic pole plates 28 and 30, and a film 96 of magnetic ink is formed in the slit 36, as shown in FIG. 7. The magnetic ink film 96 in the slit 36 immerses the one end portions of the needles 62 when located at the first position.

Figure 8:
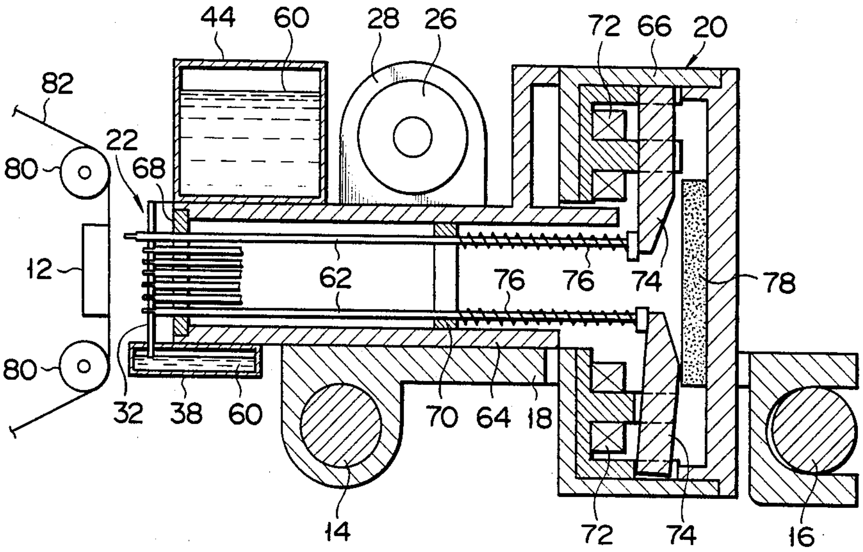
FIG. 8 is a longitudinally sectional view, similar to FIG. 5, roughly showing a state under which a needle in FIG. 5 is located at the second position.
Figure 9:
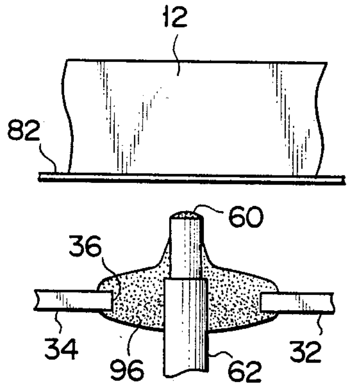
FIG. 9 is a plane view showing a state under which the needle in FIG. 7 is located at the second position.

When a key on the keyboard (not shown) is pushed, current is supplied to an electromagnet 72 which corresponds to the key, and the electromagnet 72 thus draws its corresponding armature 74 against the urging force of the return spring 76, wound around the needle 62, as shown in FIG. 8. The needle 62 which corresponds to the armature 74 drawn by the electromagnet 72 is projected through the magnetic ink film 96 in the slit 36 toward the recording paper 82 on the platen 12, as shown in FIG. 9. The position of the needle 62 under this state is called the second position of the needle 62.

Figure 10:
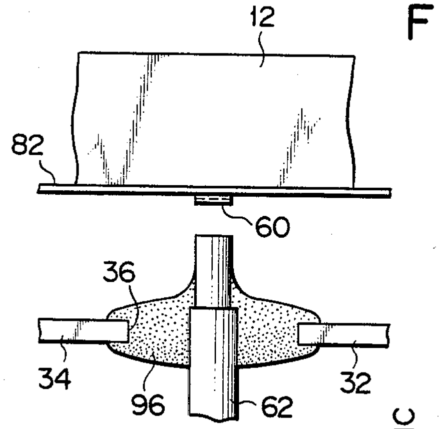
FIG. 10 is a plane view showing a state under which the needle in FIG. 9 is returned to the first position after having formed a dot of magnetic ink on the recording paper on the platen.
Figure 12:
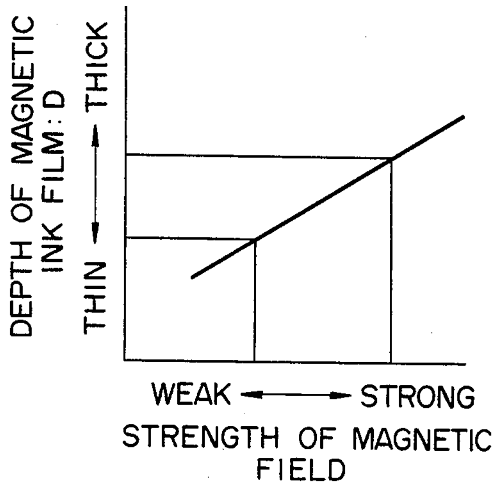
FIG. 12 roughly shows the relation between the strength of magnetic field in FIG. 11 and the thickness (D) of magnetic ink film formed in the slit between the paired magnetic pole plates by the strength of the magnetic field.

The magnetic ink 60 stuck on the end face of one end portion of the needle 62, located at the second position as shown in FIG. 9, is drawn to the recording paper 82 on the platen 12 due to inertial force caused in the magnetic ink 60 at the moment when the needle 62 is stopped at the second position and also due to magnetic force created by the platen 12, which is made of a magnet, thereby forming a dot of the magnetic ink 60 on the recording paper 82 on the platen 12, as shown in FIG. 10.

Without making the platen 12 of a magnet, it may be arranged that the magnetic ink 60 on the end face of one end portion of the needle 62 is lightly contacted with the recording paper 82 on the platen 12 when the needle 62 is located at the second position, and transferred onto the recording paper 82 to form a dot on the recording paper 82 with the transferred magnetic ink 60.

Figure 11:
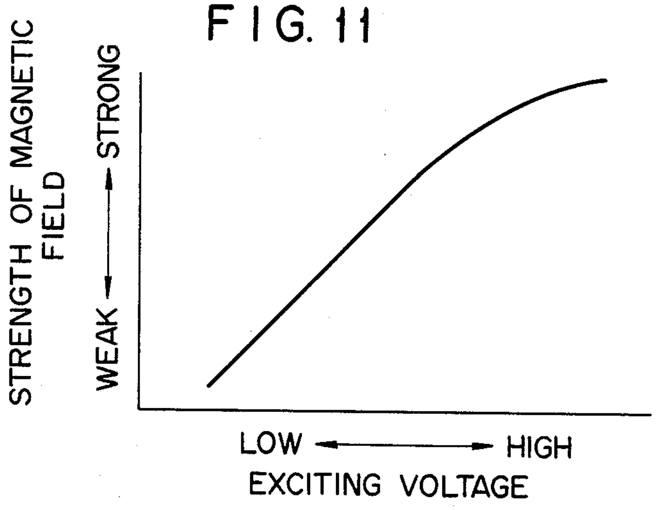
FIG. 11 shows the relation between voltage or current supplied to the electromagnet, which serves as the magnetism generating means in FIGS. 2 and 3, and the strength of magnetic field created in the slit between the paired, magnetic pole plates by current at the supplied voltage.

FIG. 11 shows the relation between the current voltage, that is exciting voltage, supplied to the electromagnet 26, which serves as the magnetism generating means, and the strength of the magnetic field, generated in the slit 36 between the paired magnetic pole plates, from which it can be found that the strength of the magnetic field becomes saturated when the exciting voltage becomes larger than a certain value. When the strength of the exciting voltage supplied to the electromagnet 26 is adjusted by operating the variable resistance 88, in FIG. 6, through the knob 92 on the housing 10, in that area where the exciting voltage can change the strength of magnetic field linearly the strength of magnetic field generated in the slit 36 changes, thereby enabling the thickness (D) of the magnetic ink film 96 in the slit 36 to be varied linearly. The thickness (D) represents the dimension of the magnetic ink film 96 measured in a direction along the longitudinal center line of the needle 62, as shown in FIG. 7. As this dimension (D) increases, the amount of the magnetic ink 60 stuck on the end face of one end portion of the needle 62 increases, and the density of the dot formed on the recording paper 82 with the magnetic ink 60, transferred from the end face of the needle 62 onto the recording paper 82 on the platen 12, thus increases. When the dimension (D) is decreased, however, the amount of the magnetic ink 60 stuck on the end face of one end portion of the needle 62 decreases and the density of the dot formed on the recording paper 82 thus becomes thinner.

When the knob 94 on the housing 10 is operated to turn OFF the main switch 90 in FIG. 6 after the printing operation of the ink dot printer is finished, the supply of current to the electromagnet 26 to excite the paired magnetic pole plates 28, 30 is stopped. In the case of this embodiment, however, the capacitor 84 is connected between both poles of the electromagnet 26. Therefore, the magnetic field generated in the slit 36 between the paired magnetic pole plates 28 and 30 vanishes, not instantly, but gradually. Accordingly, the magnetic ink 60, which forms the magnetic ink film 96 in the slit 36 between the paired magnetic pole plates 28 and 30 does not rush toward the ink tank 38 through the ventilation hole 42 at the moment when the main switch is turned OFF, but is gradually collected into the ink tank 38 through the ventilation hole 42, following the gradual vanishing of magnetic field in the slit 36. Even when the cross-sectional area of the hole 42 of the ink tank 38 is made as small as possible to prevent the evaporation of the magnetic ink 60 in the ink tank 38 and prevent dust from entering into the ink tank 38, therefore, the magnetic ink 60 will not flood out of the hole 42 of the ink tank 38 and spread around the ink tank 38 at the time of collecting the magnetic ink 60 into the ink tank 38.

The above-described embodiment is not intended to limit the present invention, but only to explain it. It should be understood, therefore, that various modifications and improvements can be made without departing from the scope and spirit of the present invention.

It may be arranged, for example, so that the electromagnet 26 which serves as the magnetism generating means for exciting the paired magnetic pole plates 28 and 30 is combined with an automatic print density maintaining means, which reads the density of dots on the recording paper 82, compares it with the reference density previously set, and controls current or voltage supplied to the electromagnet 26 on the basis of a value obtained by comparing the densities, thereby to control the strength of magnetic force generated by the electromagnet 26 and maintain the density of the dots formed on the recording paper equal to the reference density. In this case, the automatic print density maintaining means 98 can use the variable resistance 88 in FIG. 6 to control the strength of magnetic force generated by the electromagnet 26.

This automatic print density maintaining means 98 per se can be easily made by those who are skilled in the art by combining the conventional techniques.

FIG. 13 shows an example of the flow chart for the automatic print density maintaining means 98.

The ink dot printer provided with the automatic print density maintaining means 98 has an optical print density detecting means 100, which is located to the left side of the needles 62 of the printing head 20 in FIG. 2 and fixed to the carriage 18, for example. This optical print density detecting means 100 can measure the density of dots of the magnetic ink 60 formed on the recording paper 82 on the platen 12 by the needles 62 of the printing head 20, when the carriage 18 is moving from left to right in FIGS. 1 and 2.

In the case of the ink dot printer, at first, dots of the magnetic ink 60 are formed on the recording paper 82 on the platen 12 by the needles 62 of the printing head 20 when the carriage 18 is moving from left to right or from right to left in FIGS. 1 and 2. At the next time, the recording paper 82 is fed by one line by the feeding rollers 80 in the second step 104, and whether, for example, the 60-line printing is finished or not is checked in the third step 106. When the 60-line printing is not finished, the first step 102 also causes the printing head 20, in contrast to the printing in the before line, to print from right to left or from left to right.

As shown by first, second and third steps 102, 104 and 106 in the flow chart in FIG. 13, the automatic print density maintaining means 98 first causes the printing head 20 to print, for example, sixty lines on the recording paper 82. After confirming that the 60-line printing is finished, according to a fourth step 108, it is confirmed that the carriage 18 is located at the left side of the carrier shaft 14 and the guide shaft 16, as shown in FIGS. 1 and 2. When the carriage 18 is located at the left side, a further line is printed on the recording paper 82 according to a fifth step 110, causing the carriage 18 to move from left to right in FIGS. 1 and 2. When it is detected at the fourth step 108 that the carriage 18 is not located at the left side of the carrier and the guide shafts 14 and 16 after the 60-line printing is finished, a sixth step 111 causes the carriage 18 to print from right to left, and the recording paper 82 is fed by one line by the feeding rollers 80 in a seventh step 112, and then printing of a further line from left to right is achieved, as described above according to the fifth step 110. The density of a symbol, such as a character or numeral, which is read out by the optical print density detecting means 100, such as an optical sensor located at the left side of the needles 62 and attached to the carriage 18, is digitalized according to an eighth step 114. This digitalized density of the symbol measured is compared with the reference density of printed words according to a tenth step 118. The measured symbol, such as a character or numeral, is the one lastly printed in the printing process at the fifth step 110, and said reference density of printed words is previously stored in a memory circuit and read out according to a ninth step 116. When the density measured is found higher than the reference density, as the result of comparison, a twelfth step 122 is selected by an eleventh step 120, and the variable resistance 88 is controlled by a step motor, for example, at the twelfth step 122 to increase its resistance value. The step motor causes the variable resistance 88 to have a resistance value by which the thickness (D) of the magnetic ink film 96 can be made to correspond to a digital value of the measured density from which only one is subtracted. This resistance value setting process at the twelfth step 122 is repeated until the variable resistance 88 comes to have such a resistance value that allows the magnetic ink film 96 to have a thickness (D) which makes the measured density coincide with the reference density. After finishing the resistance value setting process, a fourteenth step 126 causes the feeding rollers 80 to feed the recording paper 82 by one line to prepare the printing of a next line. When the fourteenth step 126 is finished, printing can be done on a new sheet of recording paper with dots which have the same density as those dots used to print the previous sheets of recording paper.

When the density measured is not higher than the reference density, as the result of comparison at the tenth step 118, the fifteenth step 128 is selected by the eleventh step 120, and it is judged at the fifteenth step 128 whether or not the measured density coincides with the reference density. When the coincidence of these densities is confirmed, the fourteenth step 126 is selected to prepare the printing process on a next sheet of recording paper.

When it is judged at the fifteenth step 128 that the measured density does not coincide with the reference density, a sixteenth step 130 is selected since the measured density is lower than the reference density, and the variable resistance is controlled by the step motor, for example, at the sixteenth step 130 to decrease its resistance value. The step motor causes the variable resistance 88 to have a resistance value by which the thickness (D) of the magnetic ink film 96 can be made to correspond to a digital value of the measured density to which only one is added. This resistance value setting process at the sixteenth step 130 is repeated until the variable resistance 88 comes to have such a resistance value, according to a seventeenth step 132, that it allows the magnetic ink film 96 to have a thickness (D) which makes the measured density coincide with the reference density. After finishing this resistance value setting process, the fourteenth step 126 is selected to prepare the printing process on the next sheet of recording paper.

Figure 13A:
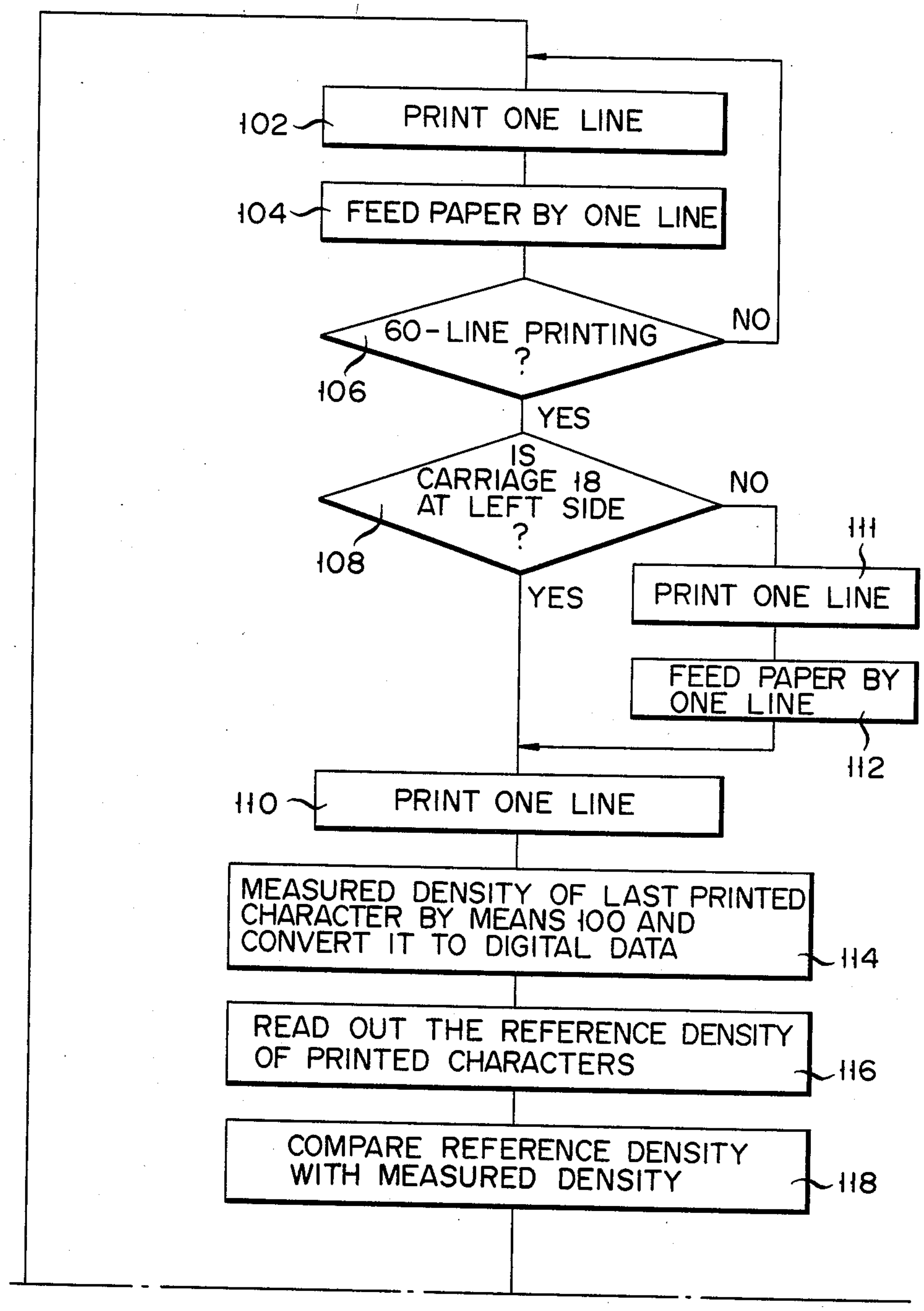
FIGS. 13A and 13B show an example of the flow chart for an automatic print density maintaining means.
Figure 13B:
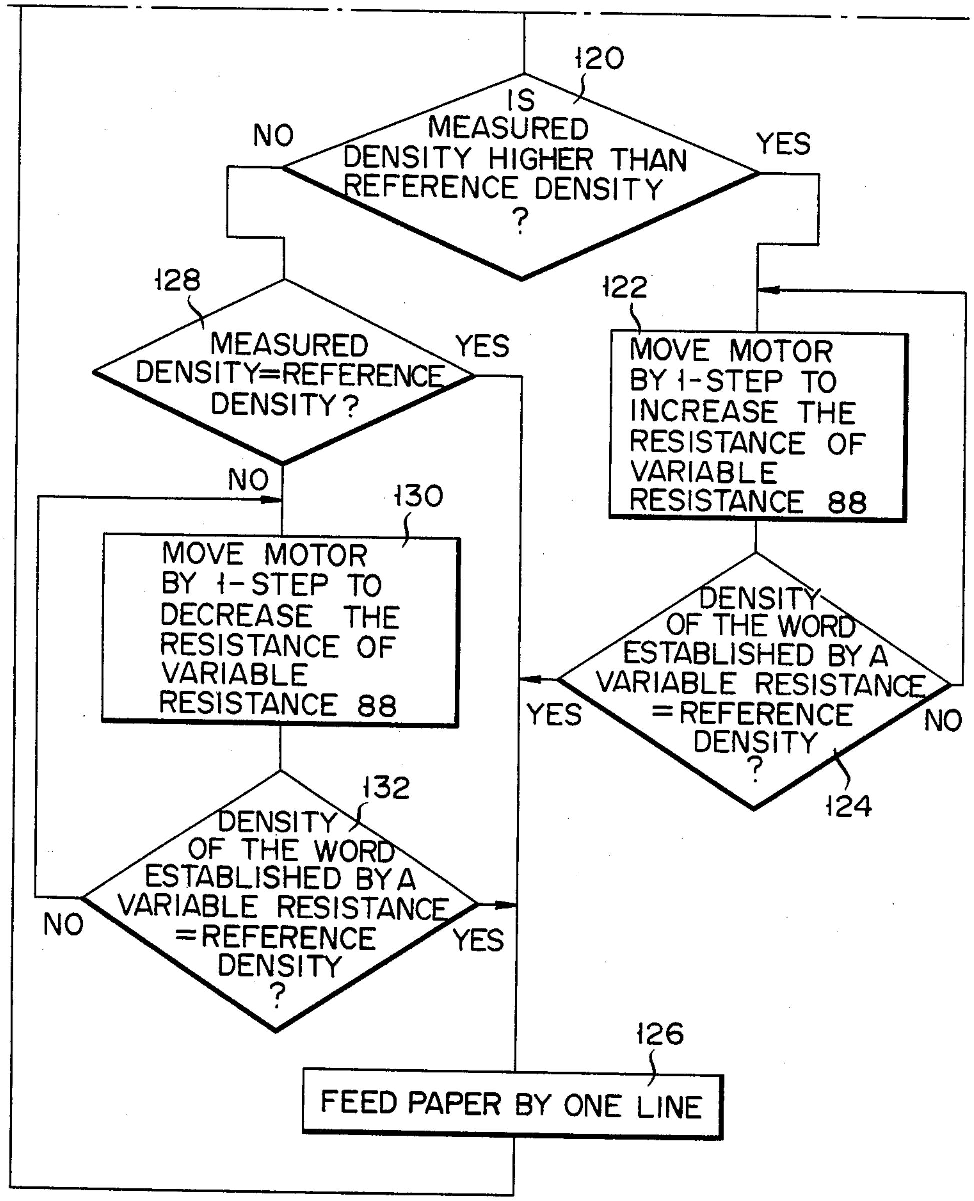

An example of the flow chart, according to which the automatic print density maintaining means 98 is operated, is shown in FIGS. 13A and 13B. However, the measurement and digitalization of the density of printed symbols by means of the optical print density detecting means 100 is not limited to the time of printing a sixty-first line, but may be done at the time when an optical line is printed or every time when a character, not a line, is printed.

When the optical print density detecting means 100 is located at the right side of the needles 62 in FIG. 2, the automatic print density maintaining means 98 can be operated, using a flow chart substantially the same as that of FIG. 13, even in the case where the dots of magnetic ink 60 are formed on the recording paper 82 on the platen 12 by the needles 62 of the printing head 20, when the carriage 18 is moving from right to left in FIGS. 1 and 2.

By changing the value of the reference density recorded in the memory, the density of symbols printed when using the automatic print density maintaining means 98 may be changed.

What is claimed is:

1. An ink dot printer comprising:

a means for storing magnetic ink;

a pair of magnetic pole plates arranged opposite to each other to form a slit, whose one end is immersed in the magnetic ink supplied from the magnetic ink storing means;

a magnetism generating means including an electro magnet for magnetizing the paired magnetic pole plates to introduce the magnetic ink supplied from the magnetic ink storing means into the slit to form a magnetic ink film therein;

a plurality of needles arranged adjacent to one another in the longitudinal direction of the slit and each freely movable in the longitudinal direction of the needle between a first position where its one end portion is immersed in the magnetic ink film in the slit between the paired magnetic pole plates and a second position where its one end portion is projected from the magnetic ink film in the slit;

a driving means for selectively driving the needles to move them from the first to the second position; and a magnetic force control means for controlling the strength of magnetic force generated by the magnetism generating means by controlling current or voltage supplied to said electromagnet, wherein the magnetic force control means has an automatic print density maintaining means, which reads the density of dots on the recording paper, compares it with the reference density previously set, and controls current or voltage supplied to the electromagnet on the basis of a value obtained by comparing the densities, thereby to control the strength of the magnetic force generated by the electromagnet and maintain the density of the dots formed on the recording paper equal to the reference density;

wherein the single or plural needles selected force the magnetic ink, which has been stuck to their one ends at the first position, onto a recording paper at the second position to form dots of magnetic ink, by the gathering of which symbols, such as characters and numerals are printed.

2. An ink dot printer according to claim 1, wherein the magnetic force control means has a variable resistance to control the strength of the magnetic force generated by the electromagnet by controlling the voltage supplied to the electromagnet.

3. An ink dot printer according to claim 1, wherein the automatic print density maintaining means has a variable resistance to control the strength of the magnetic force generated by the electromagnet by controlling the voltage supplied to the electromagnet.

4. An ink dot printer comprising:

means (44) for storing magnetic ink (60), a pair of magnetic pole plates (28, 30) arranged opposite to each other to form a slit (36), whose one end is immersed in the magnetic ink supplied from the means for storing magnetic ink, a magnetism generating means (26) for magnetizing the pair of magnetic pole plates to introduce the magnetic ink supplied from the means for storing magnetic ink into the slit to form a magnetic ink film (96) therein, a plurality of needles (62) arranged adjacent to one another in the longitudinal direction of the slit and each freely movable in the longitudinal of the needle between a first position where its one end portion is immersed in the magnetic ink film in the slit between the pair of magnetic pole plates and a second position where its one end portion is projected from the magnetic ink film in the slit, a driving means (72) for selectively driving the needles to move them from the first to the second position, and whereby the single or plural needles selected force the magnetic ink, which has been stuck to their one end at the first position, onto a recording paper at the second position to form dots of magnetic ink, by the grouping of which symbols, such as characters and numerals, are printed, wherein said magnetism generating means (26) includes a means (84) for gradually decreasing the strength of the magnetic force after said magnetism generating means (26) is deactivated.

5. An ink dot printer according to claim 4, wherein said magnetism generating means (26) has a magnetic force control means (88) for controlling the strength of magnetic force generated by the magnetism generating means.

6. An ink dot printer according to claim 4, wherein the magnetism generating means has an electromagnet and the means for gradually decreasing the magnetic force is a capacitor electrically connected to the electromagnet.

7. An ink dot printer according to claim 5, wherein the magnetism generating means includes an electromagnet, and the magnetic force control means controls the strength of the magnetic force generated by the electromagnet by controlling the current or voltage supplied to the electromagnet.

8. An ink dot printer according to claim 7, wherein the magnetic force control means has a variable resistance to control the strength of magnetic force generated by the electromagnet by controlling voltage supplied to the electromagnet.

9. An ink dot printer according to claim 7, wherein the magnetic force control means has an automatic print density maintaining means, which reads the density of dots on the recording paper, compares it with the reference density previously set, and controls current or voltage supplied to the electromagnet on the basis of a value obtained by comparing the densities, thereby to control the strength of the magnetic force generated by the electromagnet and maintain the density of the dots formed on the recording paper equal to the reference density.

10. An ink dot printer according to claim 9, wherein the automatic print density maintaining means has a variable resistance to control the strength of the magnetic force generated by the electromagnet by controlling voltage supplied to the electromagnet.

11. An ink dot printer according to claim 6, wherein said magnetism generating means (26) has a magnetic force control means (88) for controlling the strength of magnetic force generated by the magnetism generating means.

12. An ink dot printer according to claim 11, wherein the magnetic force control means controls the strength of the magnetic force generated by the electromagnet by controlling the current or voltage supplied to the electromagnet.

13. An ink dot printer according to claim 12, wherein the magnetic force control means has a variable resistance to control the strength of magnetic force generated by the electromagnet by controlling the voltage supplied to the electromagnet.

14. An ink dot printer according to claim 12, wherein the magnetic force control means has an automatic print density maintaining means, which reads the density of dots on a recording paper, compares it with the reference density previously set, and controls current or voltage supplied to the electromagnet on the basis of a value obtained by comparing the densities, thereby to control the strength of magnetic force generated by the electromagnet and maintain the density of the dots formed on the recording paper equal to the reference density.

15. An ink dot printer according to claim 14, wherein the automatic print density maintaining means has a variable resistance to control the strength of the magnetic force generated by the electromagnet by controlling the voltage supplied to the electromagnet.

* * * * *